United States Patent
Merkel et al.

(10) Patent No.: US 11,795,260 B2
(45) Date of Patent: Oct. 24, 2023

(54) BULK MATERIAL COMPRISING SOLID DIISOCYANATES AND PREPOLYMERS CONTAINING URETHANE GROUPS OBTAINABLE THEREFROM

(71) Applicant: Covestro Intellectual Property GmbH & Co. KG, Leverkusen (DE)

(72) Inventors: Michael Merkel, Düsseldorf (DE); Anna-Marie Zorn, Ettlingen (DE); Rainer Bellinghausen, Odenthal (DE); Pascal Scherpian, Moers (DE); Ralph Weber, Leichlingen (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 261 days.

(21) Appl. No.: 17/101,250

(22) Filed: Nov. 23, 2020

(65) Prior Publication Data
US 2021/0163658 A1    Jun. 3, 2021

(30) Foreign Application Priority Data
Nov. 28, 2019   (EP) ..................... 19212203

(51) Int. Cl.
*C08G 18/76* (2006.01)
*C08G 18/10* (2006.01)
*C08G 18/42* (2006.01)

(52) U.S. Cl.
CPC ......... *C08G 18/10* (2013.01); *C08G 18/4277* (2013.01); *C08G 18/7678* (2013.01)

(58) Field of Classification Search
CPC . C08G 18/7678; C08G 18/10; C08G 18/4277
See application file for complete search history.

(56) References Cited

U.S. PATENT DOCUMENTS

| | | | |
|---|---|---|---|
| 4,483,974 A | | 11/1984 | Grogler |
| 5,451,376 A | * | 9/1995 | Proksa ................... B29B 17/00 241/101.8 |
| 5,541,279 A | * | 7/1996 | Gras .................... C08G 18/807 528/45 |
| 5,891,927 A | | 4/1999 | Jeschke et al. |
| 8,110,704 B2 | | 2/2012 | Barnes et al. |
| 9,272,988 B2 | | 3/2016 | Laue et al. |
| 2002/0123594 A1 | | 9/2002 | Barnes et al. |
| 2004/0102536 A1 | | 5/2004 | Bollmann et al. |
| 2017/0152342 A1 | | 6/2017 | Sanders et al. |

FOREIGN PATENT DOCUMENTS

| | | | | | |
|---|---|---|---|---|---|
| EP | | 1997841 A2 | | 12/2008 | |
| WO | | WO-9707092 A1 | * | 2/1997 | ........... C07C 265/14 |

* cited by examiner

*Primary Examiner* — Michael L Leonard
(74) *Attorney, Agent, or Firm* — THE WEBB LAW FIRM

(57) ABSTRACT

The present invention relates to a bulk material comprising solid diisocyanate, especially naphthalene 1,5-diisocyanate or p-phenylene diisocyanate, to a process for production thereof, and to a process for preparing isocyanate prepolymers using the bulk material of the invention, to the isocyanate prepolymers themselves and to the use thereof for preparation of polyurethane elastomers, especially cast polyurethane elastomers.

4 Claims, No Drawings

BULK MATERIAL COMPRISING SOLID DIISOCYANATES AND PREPOLYMERS CONTAINING URETHANE GROUPS OBTAINABLE THEREFROM

CROSS-REFERENCE TO RELATED APPLICATION

This application claims the benefit of European Application No. 19212203.4, filed Nov. 28, 2019, which is incorporated herein by reference.

FIELD

The present invention relates to a bulk material comprising solid diisocyanate, especially naphthalene 1,5-diisocyanate or p-phenylene diisocyanate, to a process for production thereof, and to a process for preparing isocyanate prepolymers using the bulk material of the invention, to the isocyanate prepolymers themselves and to the use thereof for preparation of polyurethane elastomers, especially cast polyurethane elastomers.

BACKGROUND

Cast polyurethane elastomers are usually used for production of cellular or solid mouldings. They are typically prepared by reaction of an isocyanate component with a component having hydrogen atoms reactive toward isocyanate groups. The latter component usually comprises polyfunctional alcohols, amines and/or water.

There are in principle two possible processes for the preparation of cast polyurethane elastomers, which differ by the sequence of addition of the co-reactants. In what is called the one-shot process, the components, after gravimetric or volumetric metering, are all mixed simultaneously and reacted while undergoing shaping. A disadvantage here is that only inferior elastomers are obtained in particular when high-melting isocyanates are used since intermediates formed from short-chain polyol (chain extender) and isocyanate partly precipitate out of the reaction melt and hence are removed from any further reaction, which disrupts the further ordered increase in molecular weight. A further disadvantage of the one-shot process is the rapid release of high heat of reaction, which can frequently be removed only inadequately. The resultant high temperatures promote side reactions such as isocyanurate formation or carbodiimidization, which further impairs the elastomer properties.

For these reasons, the prepolymer process has largely become established for production of cast elastomers, in which a long-chain diol component is first reacted with excess diisocyanate to give a liquid NCO prepolymer that is then subsequently reacted with a short chain diol, for example butane-1,4-diol, or amines such as methylenebis(o-chloroaniline) (MOCA) or diethyltoluenediamine (DETDA) and/or water. This has the advantage that some of the heat of reaction is already released beforehand in the prepolymerization and removed, and the reaction in the actual polymer formation is easier to control. This promotes a more regular increase in molar mass and enables longer casting times, which facilitates the blister-free filling even of complex shapes.

Long-chain diol components used are polyether polyols, polycarbonate polyols and preferably polyester polyols, more preferably poly-ε-caprolactone polyols. Isocyanate components used for particularly high-quality cast elastomers are high melting diisocyanates such as p-phenylene diisocyanate (PPDI), 3,3-dimethyl-4,4'-biphenyl diisocyanate (TODI) and especially naphthalene 1,5-diisocyanate (NDI).

For these high-quality cast elastomers, the use of the prepolymer process is not unproblematic since the prepolymers having suitable NCO contents that are prepared at first still contain certain amounts of free, i.e. monomeric, diisocyanate that then has a tendency to crystallize at low storage temperatures, whereas storage at high temperatures leads to unwanted reactions and to an associated rise in viscosity.

EP1918315A1 describes a process for preparing NDI prepolymers in which the polyol is mixed with solid NDI at a temperature between 80 and 240° C. The temperature is chosen here such that the solid isocyanate is melted in the course of the exothermic reaction. After obtaining a clear homogeneous melt, the resultant prepolymer is cooled rapidly.

WO02081537A1 describes a process for preparing NDI prepolymers in which polyol is initially charged at 140° C. and then admixed and reacted with solid NDI under vigorous stirring.

DE10060473A1 describes the preparation of prepolymers based on naphthalene 1,4-diisocyanate or, as a comparison, naphthalene 1,5-diisocyanate. A polyol is initially charged and dewatered at 120° C. and 20 mbar, before the corresponding diisocyanate is added while stirring. The reaction mixture is then stirred at 20 mbar and 125-130° C. for 15 minutes.

WO2015185659A1 describes a continuous process for preparing NDI prepolymers, in which a melt of the diisocyanate and a polyol are reacted at 80 to 175° C. in a tubular reactor. This application, like EP1918315A1, also discusses the chemical engineering problems in the dosage of diisocyanates. For a controlled reaction with homogeneously increasing molecular weight, heating is accordingly first necessary in order to enable the rapid melting of the NDI and then, after attainment of the clear point, rapid cooling in order not to allow the reaction temperature to rise distinctly above 127° C. in the course of the exothermic reaction. Although the continuous process can avoid some problems with the batchwise processes, it is ultimately less flexible and has not become established to date owing to the intrinsically higher chemical engineering complexity.

In the inverse prepolymer processes in batchwise mode that have been described, i.e. those in which the polyol component is first initially charged and then the isocyanate is added, the reactor with each batch undergoes a change from OH- to NCO-functional contents. This results in more significant propensity of the process to fluctuation compared to regular prepolymer processes in which this change does not take place. In such regular prepolymer processes, it is possible to ensure, for example by gradual metered addition of the reactant in deficiency, that the latter is always supplied with a large excess of the reactant in excess, and this results in a very homogeneous reaction. This option of reaction control is absent in the inverse prepolymer process, in which varying excesses are inevitably present. In order to minimize the problem, the change from the OH-dominated regime to the NCO-dominated regime has to be implemented as fast as possible, meaning that the excess component, i.e. the isocyanate in this case, has to be provided to the reaction very rapidly. Nevertheless, as is apparent from the prior art, the inverse prepolymer process has become established as an intermediate step in the production of high-quality cast elastomers. This is not least because of the use of solid isocyanates. If the regular prepolymer process were to be employed, these would have to be initially charged and first melted at high temperature, already with progression of unwanted side reactions of the isocyanate.

A simple measure that can be employed regarding the extent to which side reactions have progressed in prepolymer formation is the NCO content of the prepolymer, i.e. the mass of isocyanate groups based on the total mass of the prepolymer in percent. The stoichiometry of the main reaction of the two components can be used to ascertain a theoretical value for the NCO content of the prepolymer, it being assumed that the component reactive toward NCO groups that is present in deficiency is converted fully. The further the NCO content of the prepolymer is removed from this theoretical value, i.e. the lower it is, the more frequently NCO groups were involved in other reactions, for example the reaction with urethane groups to give the allophanate, the reaction with other isocyanate groups to form uretdiones, isocyanurates, or 1-nylon, or the reaction with urea groups to form biurets.

SUMMARY

The problem addressed by the present invention was that of preparing prepolymers from solid diisocyanates in a simple and inexpensive manner and with low by-product formation.

It has now been found that, surprisingly, NCO prepolymers based on solid diisocyanates can be prepared in good quality and with a low level of by-products in a simple and inexpensive manner by using, as the diisocyanate component, a bulk material consisting essentially of particles of a solid diisocyanate having a particle size between 0.1 mm and 4 mm.

DETAILED DESCRIPTION

The present invention provides a bulk material containing or consisting of a diisocyanate solid at room temperature (25° C.), characterized in that, in a sieve analysis of the bulk material in a known manner with a twin-sieve arrangement having mesh sizes 0.1 mm and 4 mm, at least 90% by weight, preferably at least 95% by weight, of the bulk material is obtained in the fraction between 0.1 mm and 4 mm.

The sieve analysis is conducted in accordance with ASTM 1921-89, with reduction of the sieving time compared to the standard to 5 min.

Particles from this sieve fraction are particularly suitable for the preparation of prepolymers by the industrially established inverse batchwise process. As described above, the equivalence point is crossed in the inverse batchwise process, and it is known that this has to be crossed very rapidly in order to avoid the formation of long polymer chains and a resultant increase in viscosity extending as far as gelation. However, rapid addition of the isocyanate alone is insufficient for this purpose. Instead, it is also necessary to ensure that the isocyanate groups, by virtue of melting, dissolving and mixing operations, are truly available to the co-reactants. Within larger particles, in the absence of the desired co-reactant, there can already be side reactions of isocyanate groups with one another as the temperature rises. The upper limitation of the size of the particles in the bulk material of the invention, by contrast, leads to rapid melting and mixing of the isocyanate in the reaction mixture and hence to rapid attainment of the clear point and a homogeneous increase in molecular weight. The lower limitation of the size serves to largely avoid dusts that firstly are undesirable for reasons of occupational hygiene and secondly also create technical problems. The large surface area of the dust particles in turn promotes side reactions. There may be reaction, for example, of the usually hygroscopic isocyanates with humidity, forming sparingly soluble ureas. Complete exclusion of air and hence air humidity is barely achievable on the industrial scale and in view of the handling of solids. It is not least the case that dust fractions in some cases can be dispersed fully into the reaction mixture only with difficulty, and are more likely to adhere to surfaces or remain for a while as airborne matter in the gas space above the liquid level. This influences the stoichiometry of the reaction and likewise promotes unwanted side reactions.

The bulk material is preferably free-flowing. This is understood to mean a bulk material having an angle of repose of ≤55°, preferably ≤50°, measured with a Granu Heap (from Granutools). The reason for the high degree of flowability of the bulk material of the invention is essentially the claimed particle size or particle size distribution. Preferably, the bulk material contains not more than 5% by weight, preferably not more than 3% by weight and more preferably not more than 2% by weight of particles obtained in the <0.1 mm fraction in the sieve analysis. Such a bulk material, owing to its good flowability, enables optimal emptying of transport containers and simple pneumatic conveying of the bulk material.

Preferably, the bulk material of the invention is a bulk material containing or consisting of a diisocyanate solid at room temperature, characterized in that, in a sieve analysis of the bulk material in a known manner with a twin-sieve arrangement having mesh sizes 0.2 mm and 3 mm, at least 90% by weight, preferably at least 95% by weight, of the bulk material is obtained in the fraction between 0.2 mm and 3 mm. The term "undersize" is understood to mean those particles smaller than specified in the lower limit of the corresponding fraction. They are thus of such a shape that they fall, or could fall, through the finer sieve in a sieve analysis. Correspondingly, the term "oversize" is understood to mean those particles larger than specified in the upper limit of the corresponding fraction. They thus remain on the coarser, upper sieve in a sieve analysis.

If 90% by weight of the bulk material, in the case of analysis with mesh sizes of 0.1 and 4 mm, is obtained in the fraction between 0.1 and 4 mm, or, in the case of analysis with mesh sizes 0.2 and 3 mm, is obtained in the fraction between 0.2 and 3 mm, the bulk material preferably contains not more than 5% by weight of oversize and not more than 5% by weight of undersize.

In a further preferred embodiment, the bulk material contains ≥98% by weight, preferably ≥99% by weight and more preferably ≥99.5% by weight of the solid diisocyanate, based on the total mass of the bulk material. Further constituents may, for example, be by-products from the preparation of the diisocyanate, especially monoisocyanates, solvent residues or chlorinated by-products.

Suitable solid diisocyanates are those diisocyanates that are solid at room temperature, i.e. have a melting point above 25° C. These are, for example, methylene 2,2-diisocyanate, methylene 2,4-diisocyanate, methylene 4,4-diisocyanate, naphthalene 1,4-diisocyanate, naphthalene 1,5-diisocyanate, naphthalene 1,8-diisocyanate, phenylene 1,3-diisocyanate, phenylene 1,4-diisocyanate, isomers of tetralin 2,3-diisocyanate, tetralin 2,4-diisocyanate, tetralin 2,5-diisocyanate, tetralin 3,4-diisocyanate, o-toluidine diisocyanate, durene diisocyanate, benzidine diisocyanate and/or anthrylene 1,4-diisocyanate. Particular preference is given to those diisocyanates having a melting point of ≥80° C.

Very particular preference is given to naphthalene 1,5-diisocyanate or phenylene 1,4-diisocyanate.

The invention further provides a process for producing the bulk material according to the invention. For this purpose, the diisocyanate is first prepared in a known manner by phosgenating the corresponding amine. Also conceivable are phosgene-free processes, for example thermal urethane cleavage, but these have not become established on the industrial scale for various reasons for the preparation of solid diisocyanates. One option for high-melting diisocyanates, for example naphthalene 1,5-diisocyanate or phenylene 1,4-diisocyanate, is a suspension phosgenation as described in WO2014044699. Methods available for separating the diisocyanate from solvents and for further purification include those known to the person skilled in the art, for example crystallization, sublimation or distillation, optionally with addition of seed crystals or azeotroping agents, for example. In the present context, the term "crystallization" is also understood to mean simple solidification operations. It is thus not absolutely necessary to obtain crystalline material; for example, even the precipitation of amorphous solids meets the requirements.

In a first embodiment, the process for producing the bulk material of the invention comprises a crystallization operation (i) and at least one step (ii) selected from the group consisting of classification, agglomeration and comminution. Preferably, step (ii) is an agglomeration and/or a comminution; more preferably, step (ii) is a comminution.

In a preferred embodiment of the process, the crystallization operation (i) is effected by crystallizing a melt of the solid diisocyanate on a cooled surface, preferably a chill belt or a rotating drum flaker, more preferably on a rotating drum flaker cooled from the inside, and scraping it off after solidification.

The layer thickness of the crystallized solid diisocyanate on the cooled surface can be adjusted here via the operating parameters during the crystallization operation, especially via the temperatures of the melt and of the cooled surface, and the speed of advance of the cooled surface. Preferably, the layer thickness is in the range of ≥0.1 mm and ≤4.0 mm, more preferably in the range of ≥0.2 mm and ≤3.0 mm, and most preferably in the range of ≥0.5 mm and ≤2.5 mm. In this way, particles already having an advantageous extent in one dimension are obtained at a later stage, which firstly has a positive effect on the melting characteristics of the finished bulk material and secondly also simplifies the further processing to give the bulk material according to the invention.

Preferably, the crystallized diisocyanate is removed from the cooled surface with a scraper blade. Here too, it is already possible to influence the shape of the particles via the positioning and shape of the blade.

In the crystallization operation (i), only some of the particles are already obtained in the shape and size required for the bulk material according to the invention. Therefore, in the process according to the invention, at least one further step is required, selected from the group consisting of classification, agglomeration and comminution.

In the embodiment of the process according to the invention in which a classification is selected as step (ii), this is preferably effected by a dry method, i.e. by means of sieving or by means of windsifting, using a gas, preferably nitrogen or air, more preferably nitrogen, as separation medium. Preference is given to classification by means of sieving. The particles are separated here into various fractions by means of sieves in a manner known per se, such that the fraction or fractions that result in the bulk material according to the invention can subsequently be selected. In sieving processes, it is not possible to rule out that a certain proportion of the particles will have a high aspect ratio and will therefore be larger in at least one dimension than the mesh size of the sieve used in each case. This is immaterial for the bulk material of the invention since such particles only insignificantly impair the melting and mixing characteristics in the inverse prepolymer process. Excessively large or excessively small particles, i.e. those that are not obtained in the sieve fraction according to claim 1, can be recycled into the process and recrystallized. Alternatively or additionally, excessively large particles can be comminuted in a comminution apparatus.

In the embodiment of the process according to the invention in which an agglomeration is selected as step (ii), this is preferably effected in dry form by sintering or mould pressing. This embodiment is particularly advantageous when a high proportion of the primary particles, i.e. particles that are obtained after the crystallization operation, have too small a particle size to be used in the bulk material according to the invention. Alternatively, this embodiment is also advantageous in combination with a sieving or comminution step in which small particles are obtained in a controlled manner, which are then agglomerated back to the desired size. In this way, it is possible to produce very defined bulk materials. Preference is given to compression moulding, for example pelletization or tableting, which results in very uniform particles, resulting in good flowability of the bulk material consisting thereof.

In the preferred embodiment of the process according to the invention in which a comminution is selected as step (ii), this is effected in a comminution apparatus. Preferably suitable for this purpose are those comminution devices from the prior art that are designed for dry operation. It is possible to use, for example, comminution devices that consist of two or more rotating rolls that together form a roll gap in which the particles applied are comminuted. It is also possible to use what are called screw roll comminutors in which the particles are comminuted by means of counter-rotating screws. The comminuted bulk material discharged can, if required, be introduced at least partly back into a comminution apparatus, optionally with smaller milling gaps, in order to achieve the desired grain size.

Preferred comminution apparatuses are hammer mills or knife mills. Standard knife mills have a usually cylindrical grinding space. Stator blades project into this from the outside, while a rotary drum equipped with cutting blades directed outward rotates within it. A sieve, preferably a perforated screen, is preferably disposed in the periphery of the grinding space, through which the comminuted particles leave the grinding space, while excessively large particles are retained and comminuted further. The material to be comminuted can be introduced into the grinding space axially or else radially. Particular preference is given to using hammer mills as the comminution device. A rotor rotates here in a grinding chamber, the rotor being equipped with movable or fixed hammers. The impact of the hammers on the pieces of the grinding material comminutes them and throws them against the grinding wall, where further comminution takes place. As already described for the knife mills, a sieve, preferably a perforated screen, is disposed here too in the periphery of the grinding space, through which particles having less than a maximum grain size can leave the grinding space. Since this comminution step includes only an upper grain limitation, this is followed, if required, by a dedusting operation by windsifting or sieving of the bulk material.

In a further preferred embodiment of the process, any over- or undersize present is at least partly removed by classification in a step (iii) from the bulk material obtained in step (ii), the classification preferably being effected by sieving or windsifting, more preferably by sieving, and excessively large and/or excessively small particles being at least partly recycled into the process, i.e. melted or dissolved and subjected again to the crystallization operation (i). If step (ii) comprises a comminution, excessively large particles can alternatively be recycled into the comminution apparatus.

The invention further provides for the use of a bulk material according to the above description in the preparation of NCO-terminated prepolymers.

The invention further provides a process for preparing NCO-terminated prepolymers comprising or consisting of the reaction of at least one component (A) comprising or consisting of isocyanate solid at room temperature and at least one isocyanate-reactive component (B), characterized in that component (A) corresponds to a bulk material as described above.

The isocyanate-reactive component (B) preferably comprises polyols.

Suitable polyols for preparation of the prepolymers have, for example, a number-average molecular weight $M_n$ of 400 to 8000 g/mol, preferably of 600 to 6000 g/mol and more preferably of 1000 to 3000 g/mol. Their hydroxyl number is 22 to 400 mg KOH/g, preferably 30 to 300 mg KOH/g and more preferably 40 to 250 mg KOH/g and they have an OH functionality of 1.5 to 6, preferably of 1.7 to 3 and more preferably of 1.9 to 2.2.

Polyols for preparation of the prepolymers are the organic polyhydroxyl compounds known in polyurethane technology, for example the standard polyester polyols, polyacrylate polyols, polyurethane polyols, polycarbonate polyols, polyether polyols, polyester polyacrylate polyols and polyurethane polyacrylate polyols, polyurethane polyester polyols, polyurethane polyether polyols, polyurethane polycarbonate polyols, polyester polycarbonate polyols, phenol/formaldehyde resins, alone or in mixtures. Preference is given to polyester polyols, polyether polyols, polyacrylate polyols or polycarbonate polyols, particular preference is given to polyether polyols, polyester polyols and polycarbonate polyols. Most preferred are polyester polyols.

Polyether polyols include, for example, the polyaddition products of the styrene oxides, of ethylene oxide, of propylene oxide, of tetrahydrofuran, of butylene oxide, of epichlorohydrin, and the mixed addition and grafting products thereof, and the polyether polyols obtained by condensation of polyhydric alcohols or mixtures thereof and those obtained by alkoxylation of polyhydric alcohols, amines and amino alcohols. Suitable hydroxy-functional polyethers have OH functionalities of 1.5 to 6.0, preferably 1.7 to 3.0, more preferably 1.9 to 2.2, OH numbers of 22 to 400, preferably of 30 to 300, more preferably 40 to 250, mg KOH/g, and molecular weights $M_n$ of 400 to 8000, preferably of 600 to 6000, more preferably of 1000 to 3000, g/mol. These are, for example, alkoxylation products of hydroxy-functional starter molecules, for example ethylene glycol, propylene glycol, butanediol, hexanediol, trimethylolpropane, glycerol, pentaerythritol, sorbitol or mixtures of these and also other hydroxy-functional compounds with ethylene oxide, propylene oxide or butylene oxide.

Examples of polyester polyols that are of good suitability are the known polycondensates of di- and optionally tri- and tetraols and di- and optionally tri- and tetracarboxylic acids or hydroxycarboxylic acids or lactones. Instead of the free polycarboxylic acids, it is also possible to use the corresponding polycarboxylic anhydrides or corresponding polycarboxylic esters of lower alcohols to prepare the polyesters. Examples of suitable diols are ethylene glycol, butylene glycol, diethylene glycol, triethylene glycol, polyalkylene glycols such as polyethylene glycol, and also propane-1,2-diol, propane-1,3-diol, butane-1,3-diol, butane-1,4-diol, hexane-1,6-diol and isomers, neopentyl glycol or neopentyl glycol hydroxypivalate, preference being given to the three latter compounds. In order to achieve a functionality >2, it is optionally possible to use proportions of polyols having a functionality of 3, for example trimethylolpropane, glycerol, erythritol, pentaerythritol, trimethylolbenzene or trishydroxyethyl isocyanurate. Useful dicarboxylic acids include, for example, phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid, 2,2-dimethylsuccinic acid. Anhydrides of these acids are likewise usable, where they exist. For the purposes of the present invention, the anhydrides are consequently covered by the expression "acid". It is also possible to use monocarboxylic acids such as benzoic acid and hexanecarboxylic acid, provided that the mean functionality of the polyol is ≥2. Saturated aliphatic or aromatic acids such as adipic acid or isophthalic acid are preferred. One example of a polycarboxylic acid for optional additional use in smaller amounts here is trimellitic acid. Examples of hydroxycarboxylic acids that may be also used as co-reactants in the preparation of a polyester polyol having terminal hydroxyl groups include hydroxycaproic acid, hydroxybutyric acid, hydroxydecanoic acid, hydroxystearic acid and the like. Usable lactones include ε-caprolactone, butyrolactone and homologs. Preference is given to polyester polyols based on butanediol and/or neopentyl glycol and/or hexanediol and/or ethylene glycol and/or diethylene glycol with adipic acid and/or phthalic acid and/or isophthalic acid. Particular preference is given to polyester polyols based on butanediol and/or neopentyl glycol and/or hexanediol with adipic acid and/or phthalic acid. Likewise particularly preferred are linear polyester diols based on ε-caprolactone.

The useful polycarbonate polyols are obtainable by reaction of carbonic acid derivatives, for example diphenyl carbonate, dimethyl carbonate or phosgene, with diols. Useful diols of this kind include, for example, ethylene glycol, propane-1,2- and 1,3-diol, butane-1,3- and 1,4-diol, hexane-1,6-diol, octane-1,8-diol, neopentyl glycol, 1,4-bis-hydroxymethylcyclohexane, 2-methylpropane-1,3-diol, 2,2,4-trimethylpentane-1,3-diol, dipropylene glycol, polypropylene glycols, dibutylene glycol, polybutylene glycols, bisphenol A, tetrabromobisphenol A, but also lactone-modified diols. Preferably, the diol component contains 40% to 100% by weight of hexane-1,6-diol and/or hexanediol derivatives, preferably those having not only terminal OH groups but also ether or ester groups, for example products which are obtained by reaction of 1 mol of hexanediol with at least 1 mol, preferably 1 to 2 mol, of ε-caprolactone, or by etherification of hexanediol with itself to give di- or trihexylene glycol. It is also possible to use polyether polycarbonate polyols. Preference is given to polycarbonate polyols based on dimethyl carbonate and hexanediol and/or butanediol and/or ε-caprolactone. Very particular preference is given to polycarbonate polyols based on dimethyl carbonate and hexanediol and/or ε-caprolactone.

Suitable polyacrylate polyols are obtained, for example, by free-radical polymerization of olefinically unsaturated monomers having hydroxyl groups or by free-radical copolymerization of olefinically unsaturated monomers having hydroxyl groups with optionally different olefinically unsaturated monomers, for example ethyl acrylate, butyl acrylate, 2-ethylhexyl acrylate, isobornyl acrylate, methyl methacrylate, ethyl methacrylate, butyl methacrylate, cyclohexyl methacrylate, isobornyl methacrylate, styrene, acrylic acid, acrylonitrile, and/or methacrylonitrile. Suitable olefinically unsaturated monomers having hydroxyl groups are especially 2-hydroxyethyl acrylate, 2-hydroxyethyl methacrylate, the hydroxypropyl acrylate isomer mixture obtainable by addition of propylene oxide onto acrylic acid, and the hydroxypropyl methacrylate isomer mixture obtainable by addition of propylene oxide onto methacrylic acid. Suitable free-radical initiators are those from the group of the azo compounds, for example azobis(isobutyronitrile), or from the group of the peroxides, for example di-tert-butyl peroxide.

The stated polyols can be used alone or in a mixture.

The aforementioned isocyanate-reactive compounds of component (B) are reacted with the isocyanate(s) of component (A) to give NCO-terminated prepolymers containing urethane groups, using the isocyanate groups in excess over the isocyanate-reactive groups. The quantitative ratio here is such that the isocyanate component is in such an excess that the calculated (theoretical) NCO content is preferably in the range from 2.5% to 6.0%, preferably 3.0% to 5.0%.

Additives may additionally be used in the prepolymer preparation. Suitable additives are catalysts, emulsifiers, UV and hydrolysis stabilizers, and preferably stabilizers that are typically used in polyurethane chemistry. An overview can be found, for example, in "Kunststoff Handbuch [Plastics Handbook] vol. 7, ed. G. Oertel, 1983, Carl Hanser Verlag, Munich, Vienna".

Examples of catalysts are trialkylamines, diazabicyclooctane, dibutyltin dilaurate, N-alkylmorpholines, lead octoate, zinc octoate, calcium octoate and magnesium octoate, and the corresponding naphthenates, p-nitrophenoxides etc.

Examples of suitable UV and hydrolysis stabilizers are 2,6-di-tert-butyl-4-methylphenol and carbodiimides.

Examples of suitable stabilizers are Bronsted and Lewis acids, for instance hydrochloric acid, benzoyl chloride, dibutyl phosphate, adipic acid, malic acid, succinic acid, pyruvic acid, citric acid etc., and also alkyl- and arylsulfonic acids such as p-toluenesulfonic acid and preferably dodecylbenzenesulfonic acid.

The process is preferably an inverse prepolymer process in which—as already described above—the isocyanate-reactive component (B) is initially charged and the isocyanate component (A) is metered in. The isocyanate-reactive component (B) is initially charged here in liquid form, i.e. in solution or melt, while component (B) is added to and mixed with the polyol component in the form of the bulk material, i.e. in solid form, preferably while stirring. This melts the bulk material, and it reacts with the polyol component. The reaction temperature here is preferably in the range from 80 to 160° C., more preferably in the range from 100 to 150° C.

More preferably, the NCO-terminated prepolymers are prepared batchwise in an inverse prepolymer process.

The NCO prepolymers prepared by the process of the invention have NCO contents of 2.5% to 6.0%, preferably 3.0% to 5.0%, and viscosities to DIN EN ISO 3219 of 1000 to 12 000 mPas/70° C., preferably 2000 to 10 000 mPas/70° C., and can advantageously be used for production of solid or else cellular elastomers.

EXAMPLES

Raw Materials:

CAPA™ 2161A: Poly-ε-caprolactone diol from PERSTORP having a molecular weight of 1600 Da and an OH functionality of 2 (OH number 70 mg KOH/g).

The theoretical NCO content of each of the prepolymers described hereinafter was 4.07%.

Example 1 (Noninventive, Particles Too Small)

First of all, a representative sample of a bulk material containing 99.7% by weight of naphthalene 1,5-diisocyanate was separated into three fractions in a classification by means of a twin-sieve arrangement (square meshes with mesh sizes of 4 mm and 0.1 mm), and the proportions by weight thereof were determined. The fraction between 0.1 mm and 4 mm had a proportion of 88% by weight of the total mass of the bulk material, the fraction above 4 mm had a proportion of 1% by weight, and the fraction below 0.1 mm had a proportion of 11% by weight.

A glass flask was initially charged with 100 g of CAPA™ 2161A under a nitrogen atmosphere and heated to 125° C. by means of an oil bath. Then 25.94 g of the bulk material analysed in the sieve analysis beforehand was added while stirring. The reaction mixture reached a maximum temperature of 135° C. in the course of the exothermic reaction. After 30 minutes, the still-cloudy mixture was cooled down rapidly. The prepolymer obtained had an NCO content of 3.82%.

Example 2 (Inventive)

First of all, a representative sample of a bulk material containing 99.7% by weight of naphthalene 1,5-diisocyanate was separated into three fractions in a classification by means of a twin-sieve arrangement (square meshes with mesh sizes of 4 mm and 0.1 mm), and the proportions by weight thereof were determined. The fraction between 0.1 mm and 4 mm had a proportion of 96.6% by weight of the total mass of the bulk material, the fraction above 4 mm had a proportion of 1% by weight, and the fraction below 0.1 mm had a proportion of 2.4% by weight.

A glass flask was initially charged with 100 g of CAPA™ 2161A under a nitrogen atmosphere and heated to 125° C. by means of an oil bath. Then 25.94 g of the bulk material analysed in the sieve analysis beforehand was added while stirring. The reaction mixture reached a maximum temperature of 134° C. in the course of the exothermic reaction, and the reaction mixture became completely clear. After 30 minutes, the solution was cooled down rapidly. The prepolymer obtained had an NCO content of 3.90%.

Example 3 (Noninventive, 10% Excessively Large Particles)

First of all, a representative sample of a bulk material containing 99.7% by weight of naphthalene 1,5-diisocyanate was separated into three fractions in a classification by means of a twin-sieve arrangement (square meshes with mesh sizes of 4 mm and 0.1 mm), and the proportions by weight thereof were determined. The fraction between 0.1 mm and 4 mm had a proportion of 88% by weight of the total mass of the bulk material, the fraction above 4 mm had a proportion of 10% by weight, and the fraction below 0.1 mm had a proportion of 2% by weight.

A glass flask is initially charged with 100 g of CAPA™ 2161A under a nitrogen atmosphere and heated to 125° C. by means of an oil bath. Then 25.94 g of the bulk material analysed in the sieve analysis beforehand is added while stirring. The reaction mixture reaches a maximum temperature of 134° C. in the course of the exothermic reaction. After 30 minutes, the reaction mixture still contained flakes of a solid and was cooled down rapidly. The NCO content of the prepolymer was 3.79%.

Example 4 (Inventive)

The fraction between 0.2 mm and 3 mm was isolated from a bulk material containing 99.7% by weight of naphthalene 1,5-diisocyanate in a classification by means of a twin-sieve arrangement (square meshes with mesh sizes of 3 mm and 0.2 mm), giving a bulk material in which more than 99% of the particles belonged to this fraction. This was used to prepare a prepolymer as in example 2. The prepolymer obtained had an NCO content of 3.91%.

What is claimed is:

1. A process for producing a bulk material, comprising a crystallization operation (i) and at least one step (ii) comprising classification, agglomeration, or comminution,
    wherein the bulk material comprises a solid diisocyanate, wherein the solid diisocyanate is a solid at room temperature (25° C.), wherein the solid diisocyanate has a melting point of ≥80° C., and wherein, in a sieve analysis of the bulk material with a twin-sieve arrangement having mesh sizes 0.1 mm and 4 mm, at least 90% by weight of the bulk material is obtained in a fraction between 0.1 mm and 4 mm.

2. The process according to claim 1, wherein the crystallization operation (i) comprises crystallizing a melt of the solid diisocyanate on a cold surface and scraping off the solid diisocyanate after solidification.

3. The process according to claim 1, wherein step (ii) comprises comminution of the solid diisocyanate performed in a comminution apparatus.

4. The process according to claim 1, wherein oversize bulk material and undersize bulk material are at least partly separated by classification in a step (iii) from the bulk material obtained in step (ii) and wherein a portion of the oversize bulk material and/or a portion of the undersize bulk material is at least partly recycled into the process.

* * * * *